United States Patent
Zani et al.

(10) Patent No.: US 6,973,593 B1
(45) Date of Patent: Dec. 6, 2005

(54) SYSTEM ANALYZER FOR A DATA STORAGE SYSTEM

(75) Inventors: Mark Zani, Salem, NH (US); Ofer Porat, Westborough, MA (US); Alexander Rabinovich, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 623 days.

(21) Appl. No.: 10/100,458

(22) Filed: Mar. 18, 2002

(51) Int. Cl.[7] ............................................. G06F 11/00
(52) U.S. Cl. ........................... 714/31; 714/30; 714/47
(58) Field of Search ............................... 714/30, 31, 47

(56) References Cited

U.S. PATENT DOCUMENTS

2002/0170000 A1 * 11/2002 Gorodelsky et al. .......... 714/30
2004/0153802 A1 * 8/2004 Kudo et al. .................... 714/30

* cited by examiner

*Primary Examiner*—Nadeem Iqbal
*Assistant Examiner*—Timothy M. Bonura
(74) *Attorney, Agent, or Firm*—David E. Huang, Esq.

(57) ABSTRACT

A system analyzer for a data storage system has a control module and a memory module. The system analyzer includes a logic analyzer, an input port that couples to the data storage system, an output port that couples to the logic analyzer, and a pre-processor which is interconnected between the input port and the output port. The pre-processor is configured to receive, while a first point-to-point signal is exchanged between the control module and the memory module, a second point-to-point signal which is a copy of the first point-to-point signal. The pre-processor is further configured to generate a pre-processed signal based on the second point-to-point signal, and to provide the pre-processed signal to the logic analyzer.

20 Claims, 7 Drawing Sheets

SYSTEM ANALYZER FOR A DATA STORAGE SYSTEM

BACKGROUND OF THE INVENTION

A typical data storage system stores and retrieves data on behalf of one or more host computers. One conventional data storage system includes a set of multi-drop buses, a set of front-end interface modules (also referred to as front-end directors), a set of memory modules, a set of back-end interface modules (also referred to as back-end directors), and a set of disk drives. The set of memory modules connects to the set of multi-drop buses and operates as a cache to temporarily store blocks of data exchanged between the host computers and the set of disk drives. The set of front-end interface modules connects to the set of multi-drop buses and operates as a front-end to the cache, i.e., transfers blocks of data between the host computers and the cache. Similarly, the set of back-end interface modules connects to the set of multi-drop buses and operates as a back-end to the cache, i.e., transfers blocks of data between the cache and the set of disk drives.

During development of such a data storage system, the data storage system manufacturer can replace one of the interface modules with a customized module which is configured to watch traffic on the set of buses and communicate that traffic to a logic analyzer. To this end, the manufacturer disconnects one of the interface modules from the set of buses and connects the customized module to the set of buses in its place. The manufacturer then operates the logic analyzer while the data storage system is running in order to test and/or debug the operation of the data storage system. In particular, the manufacturer uses the customized module to monitor or "snoop" the set of buses, and uses the logic analyzer to analyze signals exchanged between the remaining interface modules and the memory modules. Accordingly, the manufacturer can determine whether the data storage system operates properly, and identify sources of problems if they exist.

SUMMARY OF THE INVENTION

Unfortunately, there are deficiencies to the above-described approach to testing and debugging a data storage system by disconnecting an interface module from a set of buses of the data storage system, and connecting a customized module (which leads to a logic analyzer) to the set of buses in its place. For example, the removal of the interface module means that the data storage system is no longer capable of generating maximum traffic. That is, the data storage system can no longer have a maximum configuration since the removed interface module is no longer available to perform work. Accordingly, the traffic monitored by the logic analyzer does not truly represent the traffic of a fully configured data storage system.

Additionally, the above-described approach may not be well-suited for monitoring data storage systems which use communication mechanisms that are not multi-drop buses. For example, the above-described approach may not be well-suited for a data storage system having modules that communicate through non-blocking, point-to-point channels because such a data storage system may not have a commonly shared communications medium (e.g., a multi-drop bus) from which to snoop or tap into. Rather, in such a data storage system, each module has a separate, or private, non-blocking point-to-point channel with another module. Accordingly, the above-described approach cannot connect to and snoop on a commonly shared communications medium.

The invention is directed to techniques for monitoring operation of a data storage system having a control module and a memory module. The techniques use, while a first point-to-point signal is exchanged between the control module and the memory module, a second point-to-point signal which is a copy of the first point-to-point signal. Use of the second point-to-point signal alleviates the need to tap into or snoop the first point-to-point signal. Accordingly, drawbacks characterizing the above-described approach of having to remove a module from a set of multi-drop buses and replace that module with a customized module that monitors the set of multi-drop buses such as being unable to test the data storage system under a maximum traffic load are avoided. Moreover, the techniques of the invention are well-suited for use in data storage systems having communications media that are not multi-drop buses such as in data storage systems having point-to-point architectures. A data storage system having a point-to-point topology similar to that mentioned above is described in U.S. patent application Ser. No. 09/741,494, filed Dec. 19, 2000 and entitled "METHODS AND APPARATUS FOR TRANSFERRING A DATA ELEMENT WITHIN A DATA STORAGE SYSTEM," the teachings of which are hereby incorporated by reference in their entirety.

One embodiment of the invention is directed to a system analyzer for a data storage system having a control module and a memory module. The system analyzer includes a logic analyzer, an input port that couples to the data storage system, an output port that couples to the logic analyzer, and a pre-processor which is interconnected between the input port and the output port. The pre-processor is configured to receive, while a first point-to-point signal is exchanged between the control module and the memory module, a second point-to-point signal which is a copy of the first point-to-point signal. The pre-processor is further configured to generate a pre-processed signal based on the second point-to-point signal, and to provide the pre-processed signal to the logic analyzer. The availability of the second point-to-point signal alleviates the need to remove a working module (e.g., an interface module) and replace it with a customized module which is dedicated to monitoring traffic, which is a common conventional approach when testing and debugging a data storage system having a set of multi-drop buses. Rather, the data storage system under test can be left as is (e.g., fully configured to produce maximum or worst-case traffic which is free of signal integrity degradation from the logic analyzer), and a copy of the first point-to-point signal, i.e., the second point-to-point signal, can be monitored instead of the first point-to-point signal.

In one arrangement, the pre-processor, when generating the pre-processor signal, is configured to determine whether the second point-to-point signal complies with a signaling protocol, and create, as the pre-processed signal, a signal which includes (i) data from the second point-to-point signal and (ii) status indicating whether the second point-to-point signal complies with the signaling protocol. Accordingly, pre-processor can perform error-checking operations prior to processing by the logic analyzer thus offloading at least some of the error-checking burden from the logic analyzer and freeing the logic analyzer to perform other functions (e.g., process other monitored signals).

In one arrangement, the second point-to-point signal includes information in an initially serialized form. In this arrangement, the pre-processor, when generating the pre-processor signal, is configured to (i) de-serialize the information of the second point-to-point signal, and (ii) form, as the pre-processed signal, a signal which includes the de-serialized information of the second point-to-point signal. Such de-serialization enables the logic analyzer to process non-serialized data (e.g., signals in parallel form) even though the point-to-point signals exchanged with the data storage system may include serialized information traveling through point-to-point channels.

In one arrangement, the pre-processor, when receiving the second point-to-point signal, is configured to obtain, while the first point-to-point signal travels through a backplane between the control module and the memory module, the second point-to-point signal from one of the control module and the memory module through the backplane. In this arrangement, the pre-processor can tap into the same backplane that carries the first point-to-point signal between the control module and the memory module, but without requiring replacement of a working module with a customized module. For example, an adaptor module can be connected to a designated location on the backplane that is not configured to be occupied by another control module or another memory module.

In one arrangement, the system analyzer further includes an adaptor module, and a cable having a first end which connects to the adaptor module, and a second end which connects to the input port. The adaptor module is configured to buffer the second point-to-point signal, and pass the second point-to-point signal through the cable and the input port to the pre-processor. Accordingly, the pre-processor can be located relatively far from the data storage system (e.g., one to two feet or meters), and the adaptor module can provide communications resources for driving signals over a relatively large distance (i.e., through the cable) to convey the second point-to-point signal from the data storage system to the pre-processor.

In one arrangement, the system analyzer further includes another cable having a first end which connects to the output port and a second end which connects to the logic analyzer. In this arrangement, the pre-processor, when providing the pre-processed signal to the logic analyzer, is configured to pass the pre-processed signal through the output port and the other cable to the logic analyzer. Accordingly, the logic analyzer can be located relatively far from the pre-processor (e.g., one to two meters), and the pre-processor can provide communications resources for driving signals through the other cable to the logic analyzer. Additionally, the other cable can easily disconnect from the logic analyzer and connect, along with other cables from other pre-processors, to a set of expansion chassis which are disposed between the pre-processors and the logic analyzer thus providing convenient flexibility and scalability for the system analyzer (e.g., the capability to process many point-to-point signals of the data storage system simultaneously).

The features of the invention, as described above, may be employed in data storage systems, devices and methods as well as other computer-related components such as those of EMC Corporation of Hopkinton, Mass.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for monitoring operation of a data storage system having a control module and a memory module. The techniques use, while a first point-to-point signal is exchanged between the control module and the memory module, a second point-to-point signal which is a copy of the first point-to-point signal. Use of the second point-to-point signal alleviates the need to tap into or snoop the first point-to-point signal. Accordingly, drawbacks characterizing a conventional approach of removing a module from a set of multi-drop buses and replacing that module with a customized module that monitors the set of multi-drop buses (e.g., being unable to test the data storage system under a maximum traffic load) are avoided. Moreover, the techniques of the invention are well-suited for use in data storage systems having communications media that are not multi-drop buses such as in data storage systems having point-to-point architectures.

Figure 1:
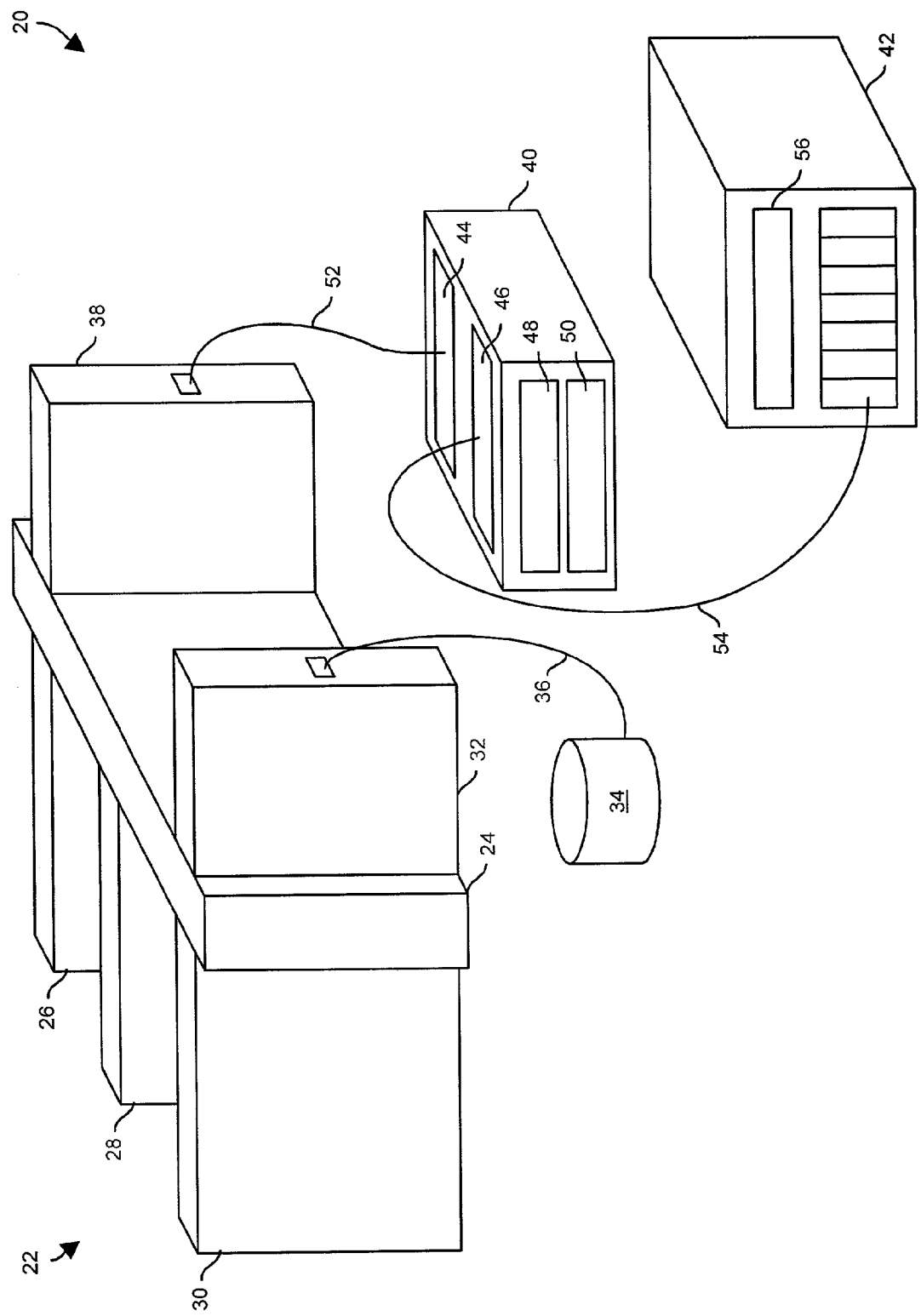
FIG. 1 is a perspective view of a data storage system and a system analyzer which are suitable for use by the invention.

FIG. 1 shows a system analyzer 20 and a data storage system 22 which are suitable for use by the invention. The data storage system 22 includes an interconnection mechanism 24 (e.g., a backplane interconnect or simply backplane), a first control module 26, a memory module 28, a second control module 30, a disk drive adaptor module 32 and a set of disk drives 34. The modules 26, 28, 30, 32 connect to and communicate through the interconnection mechanism 24.

The memory module 28 operates as a cache (or a portion thereof) for the data storage system 22. The first control module 26 operates as a front-end to the data storage system 22 by transferring data (e.g., data blocks) between one or more hosts and the cache. Similarly, the second control module 30 operates as a back-end to the data storage system 22 by transferring data between the cache and the set of disk drives 34. The disk drive adaptor module 32 conveys signals (e.g., block I/O signals) between the second control module 30 (i.e., a back-end interface module of the data storage system 22) and the set of disk drives 34.

In some arrangements, the data storage system 22 includes multiple control modules 26 which, as a whole, operate as a front-end to the data storage system 22 in a load balancing and fault tolerant manner (i.e., as front-end directors). In support of the control modules 26, the data storage system 22 can include a corresponding number of client communication adaptors (e.g., which physically connect on an opposite side of a backplane to a corresponding control module 26) to convey signals between the control modules 26 and one or more clients.

Similarly, in some arrangements, the data storage system 22 includes multiple control modules 30 which, as a whole, operate as a back-end to the data storage system 22 in a load balancing and fault tolerant manner (i.e., as back-end directors). In support of the multiple control modules 30, the data storage system 22 can include a corresponding number of disk drive adaptors 32 (e.g., which physically connect on an opposite side of a backplane to a corresponding control module 32) to convey signals between the control modules 30 and the set of disk drives 34.

Furthermore, in some arrangements, the data storage system 22 includes multiple memory modules 28 to provide sufficient memory for caching data exchanged between the clients and the set of disk drives 34. Such memory is available for memory management enhancements and optimizations such as data pre-fetching, read-modify-write operations, etc.

As will be explained in further detail later, the control modules 26, 30 and the memory modules 28 communicate with each other through point-to-point channels within the interconnection mechanism 24. Such channels carry serialized data (e.g., one high-speed serial link for carrying a high byte of data, another high-speed serial link for carrying a low byte of data, etc.) in a non-blocking manner. Accordingly, arbitration delays and bottlenecks between the modules 26, 28, 30 can be eliminated.

The system analyzer 20 includes an adaptor module 38, a pre-processing device 40, and a logic analyzer 42. The pre-processing device 40 includes an input port 44, an output port 46, a display 48 and a pre-processing circuit 50. The pre-processing circuit 50 (or simply pre-processor 50) connects to each of the input port 44, the output port 46 and the display 48. The system analyzer 20 further includes a first cable 52 that connects the adaptor module 38 to the input port 44 of the pre-processing device 40, and a second cable 54 that connects the output port 46 of the pre-processing device 40 to the logic analyzer 42. The logic analyzer 42 includes circuitry 56 that receives, processes and renders operating information regarding the data storage system 22.

Installation attributes of the system analyzer 20 will now be provided in further detail. The adaptor module 38 of the system analyzer 20 can occupy a designated location of the interconnection mechanism 24 that is not configured to be regularly occupied by another control module 26, 30 or memory module 28. For example, the adaptor module 38 can occupy a location that is typically occupied by a standard client communication adaptor, or alternatively, a standard disk drive adaptor 32. Accordingly, a user (e.g., an engineer or technician) can replace the standard adaptor with the adaptor module 38 with no reduction in the amount of communication traffic between the control modules 26, 30 and the memory modules 28. As a result, the invention can avoid the drawback of the earlier-described conventional data storage system in which replacement of an interface module with a customized snooping module results in a reduction in the maximum amount of bus traffic, i.e., the inability to generate the traffic of a fully configured data storage system.

In one arrangement, the adaptor module 38 operates as both a client communication adaptor for conveying signals between a client and a corresponding control module 26 (and thus maintains full operability of the data storage system 22), as well as an interface for connecting the system analyzer 20 to the data storage system 22. That is, the adaptor module 38 of the system analyzer 20 operates as a portion of the data storage system 22 as well. In another arrangement, the adaptor module 38 does not operate as a client communication adaptor, but simply as a data storage system interface for connecting the system analyzer 20 to the data storage system 22. In either case, the adaptor module 38 enables the system analyzer 20 to monitor activity of the data storage system 22 in a transparent manner. That is, there is no reduction in traffic between the modules 26, 28, 30 since the system analyzer 20 connects to a designated location on the backplane that is not configured to be regularly occupied by another control module or another memory module, i.e., since none of the modules 26, 28, 30 is replaced. Further details of the invention will now be provided with reference to FIG. 2.

Figure 2:
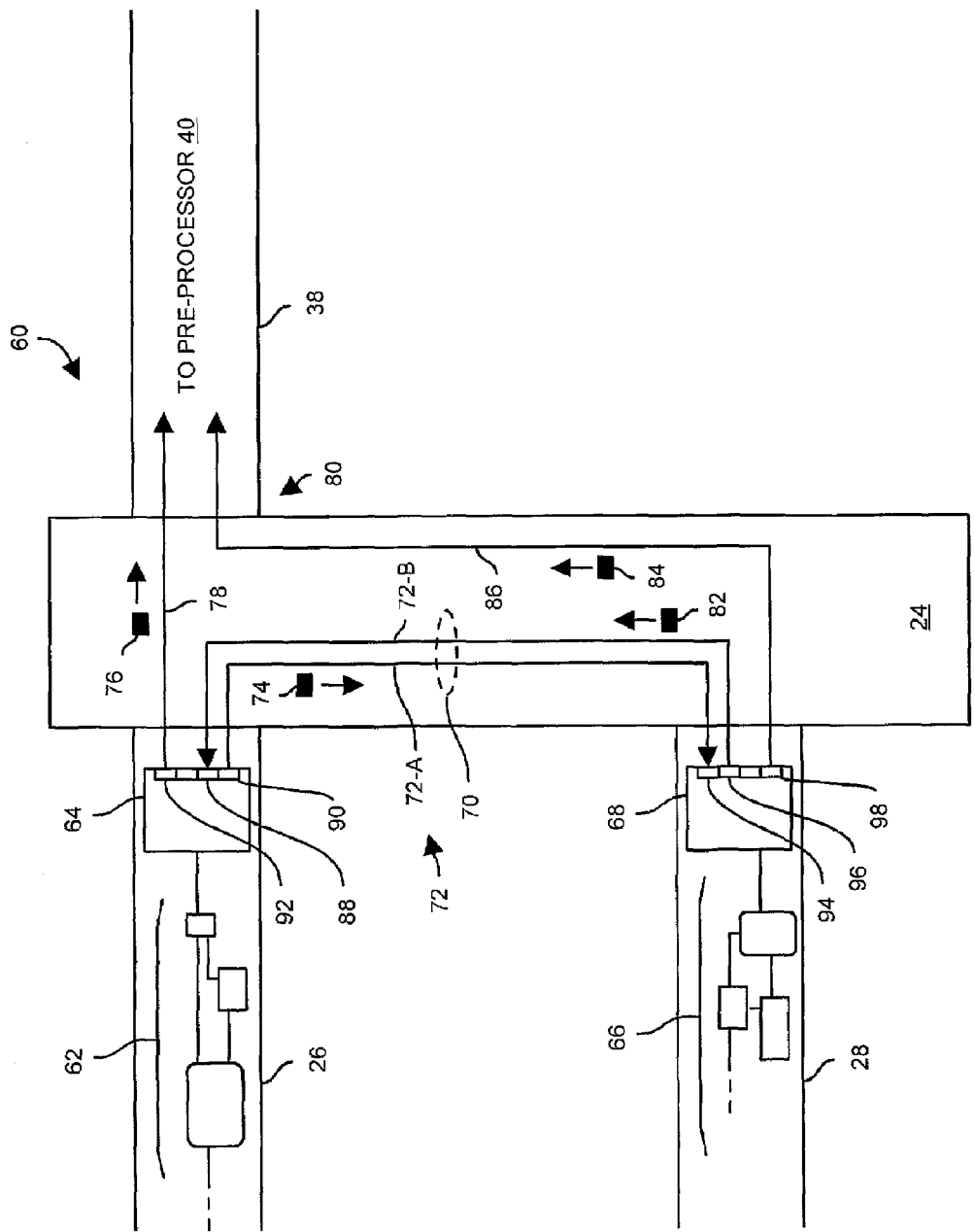
FIG. 2 is a top view of a portion of the data storage system and the system analyzer of FIG. 1.

FIG. 2 shows a top view 60 of a portion of the data storage system 22 and the system analyzer 20. The view includes only a portion of the interconnection mechanism 24. As shown, the control module 26 (e.g., a front-end interface module) includes control circuitry 62 and interface circuitry 64. Similarly, the memory module 28 includes memory circuitry 66 and interface circuitry 68. The interface circuitry 64 of the control module 26 and the interface circuitry 68 of the memory module 28 communicate through a point-to-point channel 70 within the interconnection mechanism 24. The point-to-point channel 70 includes a first set of unidirectional links 72-A which carries signals from the control module 26 to the memory module 28, and a second set of unidirectional links 72-B which carries signals from the memory module 28 to the control module 26. In one arrangement, each set of unidirectional links 72-A, 72-B includes four conductors (electrical etch, fiber optic cable, etc.) which carry a first differential pair of point-to-point signals for a high byte of data and a second differential pair of point-to-point signals for a low byte of data.

During operation, the interface circuitry 64 of the control module 26 is configured to provide a first set of point-to-point signals 74 and a second set of point-to-point signals 76 which is a copy of the first set of point-to-point signals 74. The first set of point-to-point signals 74 travels through the point-to-point channel 70 to the memory module 28 (e.g., one or more pairs of differential signals travels through the set of unidirectional links 72-A). The second set of point-to-point signals 76 is available for monitoring, e.g., for testing and debugging purposes. To this end, the interconnection mechanism 24 further includes a set of connections 78 which conveys the second set of point-to-point signals 76 to the signal analyzer 20. In particular, the adaptor module 38 of the system analyzer 20 connects to a dedicated location 80 of the interconnection mechanism 24 to receive the second set of point-to-point signals 76 from the interface circuitry 64 of the control module 26. Accordingly, there is no need to tap into the point-to-point channel 70 to monitor communications traffic from the control module 26 to the memory module 28. As a result, there are no drawbacks associated with intruding into the point-to-point channel 70 (e.g., signal integrity changes due to changes in line capacitance, higher power and fan out requirements, etc.). Rather, the first set of point-to-point signals 74 can be left undisturbed and the system analyzer 20 can monitor activity between the control module 26 and the memory module 28 using the second set of point-to-point signals 76 which is a copy of the first set of point-to-point signals 74.

Moreover, connection of the adaptor module 38 to the interconnection mechanism 24 does not require removal of a control module 26, 30 or a memory module 28 (also see FIG. 1). Rather, the adaptor module 38 can replace a standard client communication adaptor associated with a control module 26 or a standard disk drive adaptor associated with a control module 30. Accordingly, there is no reduction in traffic among the modules 26, 28, 30 when the adaptor module 38 is in place. To the contrary, the data storage system 22 can operate in a fully configured manner to provide maximum communication traffic between modules 26, 28, 30. As such, the system analyzer 20 has the capability to monitor and analyze the data storage system 22 at peak operation (e.g., under worst-case or maximum throughput conditions).

It should be understood that the interface circuitry 68 similarly provides a first set of point-to-point signals 82 and a second set of point-to-point signals 84 which is a copy of the first set of point-to-point signals 82. The first set of point-to-point signals 82 travels through the point-to-point channel 70 to the control module 26 (e.g., one or more differential pairs of point-to-point signals travels through the set of unidirectional links 72-B). The second set of point-to-point signals 84 is available for monitoring, e.g., for testing and debugging purposes. For such purposes, the interconnection mechanism 24 further includes a set of connections 86 which conveys the second set of point-to-point signal 84 to the adaptor module 38 of the signal analyzer 20. Again, there is no need to tap into the point-to-point channel 70 to monitor communications traffic from the memory module 28 to the control module 26. Rather, the first set of point-to-point signals 82 can be left undisturbed and the system analyzer 20 can monitor activity between the control module 26 and the memory module 28 using the second set of point-to-point signals 84 which is a copy of the first set of point-to-point signals 82. Thus, there are no deficiencies associated with intruding into the point-to-point channel 70 (e.g., signal integrity changes due to changes in line capacitance, higher power and fan out requirements, etc.).

An IC device which is suitable for use in providing the interface circuitry 64 of the control module 26 and/or the interface circuitry 68 of the memory module 28 is a Serializer-Deserializer (SERDES) device having redundant transmit (TX) ports (i.e., a primary TX port and a redundant TX port). In particular, and as shown in FIG. 2, the interface circuitry 64 of the control module 26 can reside in an IC which has an input 88 that receives the first point-to-point signal 82 from the memory module 28, a first output 90 that provides the first set of point-to-point signals 72 and a second output 92 that provides the second set of point-to-point signals 74. Similarly, the interface circuitry 68 of the memory module 28 resides in another IC which has an input 94 that receives the first set of point-to-point signals 72 from the control module 26, a first output 96 that provides the first set of point-to-point signals 82 and a second output 98 that provides the second set of point-to-point signals 84. The redundant transmit ports (i.e., outputs 92, 98) allow data on the primary transmit ports (i.e., on output ports 90, 96) to be viewed without connecting directly to the primary transmit ports and thus without disrupting the signals on the primary transmit ports.

An example of a SERDES device that is similar to that described above is the VSC7216 which is provided by Vitesse Semiconductor Corporation of Camarillo, Calif. Further details of the invention will now be provided with reference to FIG. 3.

Figure 3:
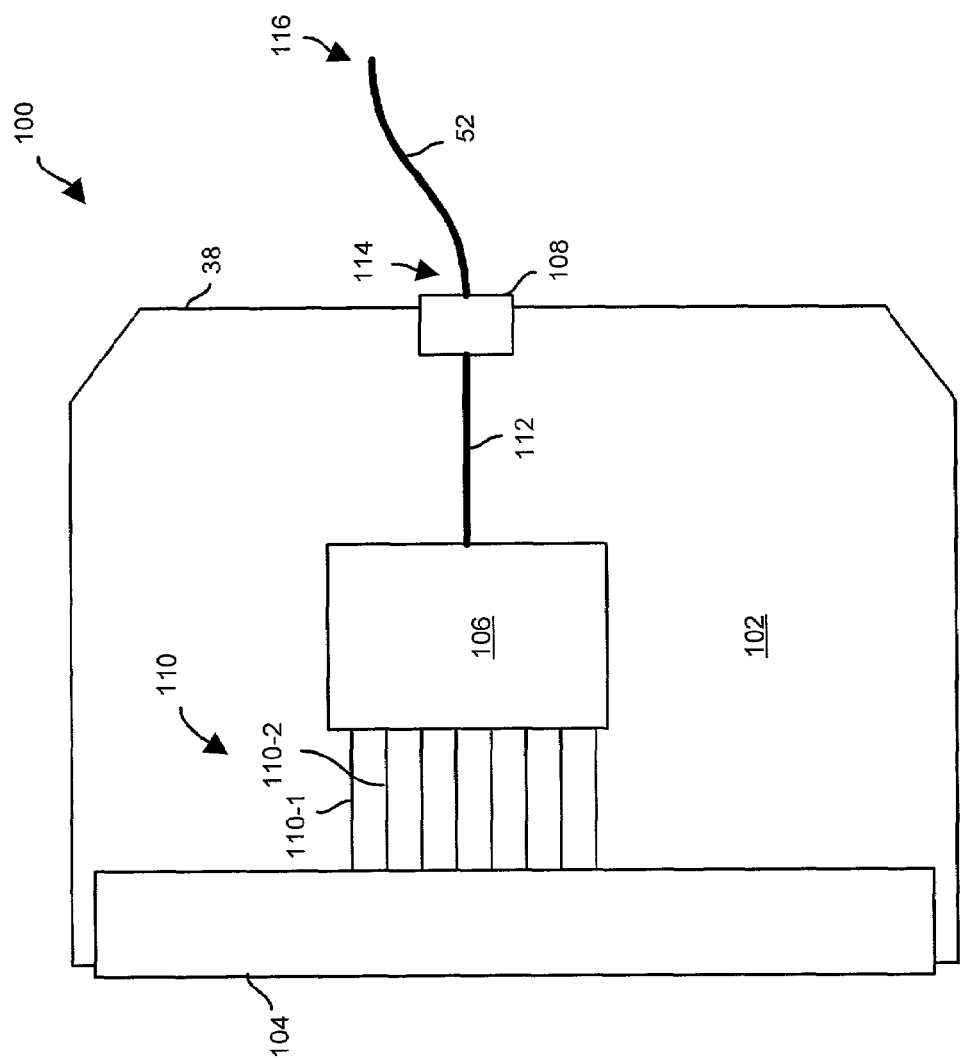
FIG. 3 is a side view of an adaptor module of the system analyzer of FIG. 1.

FIG. 3 is a block diagram 100 (a side view) of the adaptor module 38 of the system analyzer 20. The adaptor module 38 includes a section of circuit board material 102, a set of interconnect connectors 104, a buffer circuit 106, and a cable connector 108. The section of circuit board material 102 provides physical support for the set of interconnect connectors 104, the buffer circuit 106, and the cable connector 108. Additionally, the section of circuit board material 102 provides (i) a first set of conductors 110 (e.g., metallic etch) which connects the set of interconnect connectors 104 to the buffer circuit 106 and (ii) a second set of conductors 112 which connects the buffer circuit 106 to the cable connector 108. As shown, the set of conductors 110 includes a collection of serial lines 110-1, 110-2, . . . (collectively, serial lines 110) for carrying respective point-to-point signals from the interconnection mechanism 24 to the buffer 106. For example, the serial line 110-1 can carry a point-to-point signal which is a copy of another point-to-point signal exchanged between two modules of the data storage system 22, the serial line 110-2 can carry yet another point-to-point signal which is a copy of yet another point-to-point signal exchanged between two different modules of the data storage system 22, and so on.

It should be understood that the serial lines 110 are configured to carry serial point-to-point signals from the interconnection mechanism 24 to the buffer circuit 106, and that the set of conductors 112 still carry serial signals but in a higher-density manner for eventual conveyance through a high-density connector 108 and cable 52 to the pre-processing device 40 (also, see FIG. 1).

Also shown in FIG. 3 is the cable 52 which connects the adaptor module 38 to the pre-processing device 40. A first end of the cable 52 connects to the cable connector 108 and a second end of the cable 52 connects to the pre-processing device 40.

During operation, the adaptor module 38 takes high-speed serial point-to-point signals from the data storage system 22 and directs them to the pre-processing device 40. In particular, the buffer circuit 106 of the adaptor module 38 captures and temporarily stores the second sets of point-to-point signals 76, 84, which are copies of the first sets of point-to-point signals 74, 82 exchanged between the control module 26 and the memory 28. The buffer circuit 106 then rebuffers the point-to-point signals 76, 84, i.e., outputs or drives the point-to-point signals 76, 84 so that the point-to-point signals 76, 84 are strong enough to travel the length of the cable 52 and be properly received by the pre-processing device 40. Accordingly, the pre-processor 50 can be located relatively far from the data storage system (e.g., one to two feet or meters), and the adaptor module 38 can provide communications resources for driving signals over a relatively large distance (i.e., through the cable) to convey the second set of point-to-point signals 76, 84 from the data storage system 22 to the pre-processor 50.

In one arrangement, the adaptor module 38 further includes additional circuitry that enables a corresponding control module (e.g., see the control module 26 of FIGS. 1–2) to communicate with an external component (e.g., a host/client, a disk drive, etc.). In another arrangement, the adaptor module 38 does not include such additional circuitry and is configured solely to buffer and steer point-to-point signals from the data storage system 22 to the pre-processor device 40 of the system analyzer 20. Further details of the invention will now be provided with reference to FIG. 4.

Figure 4:
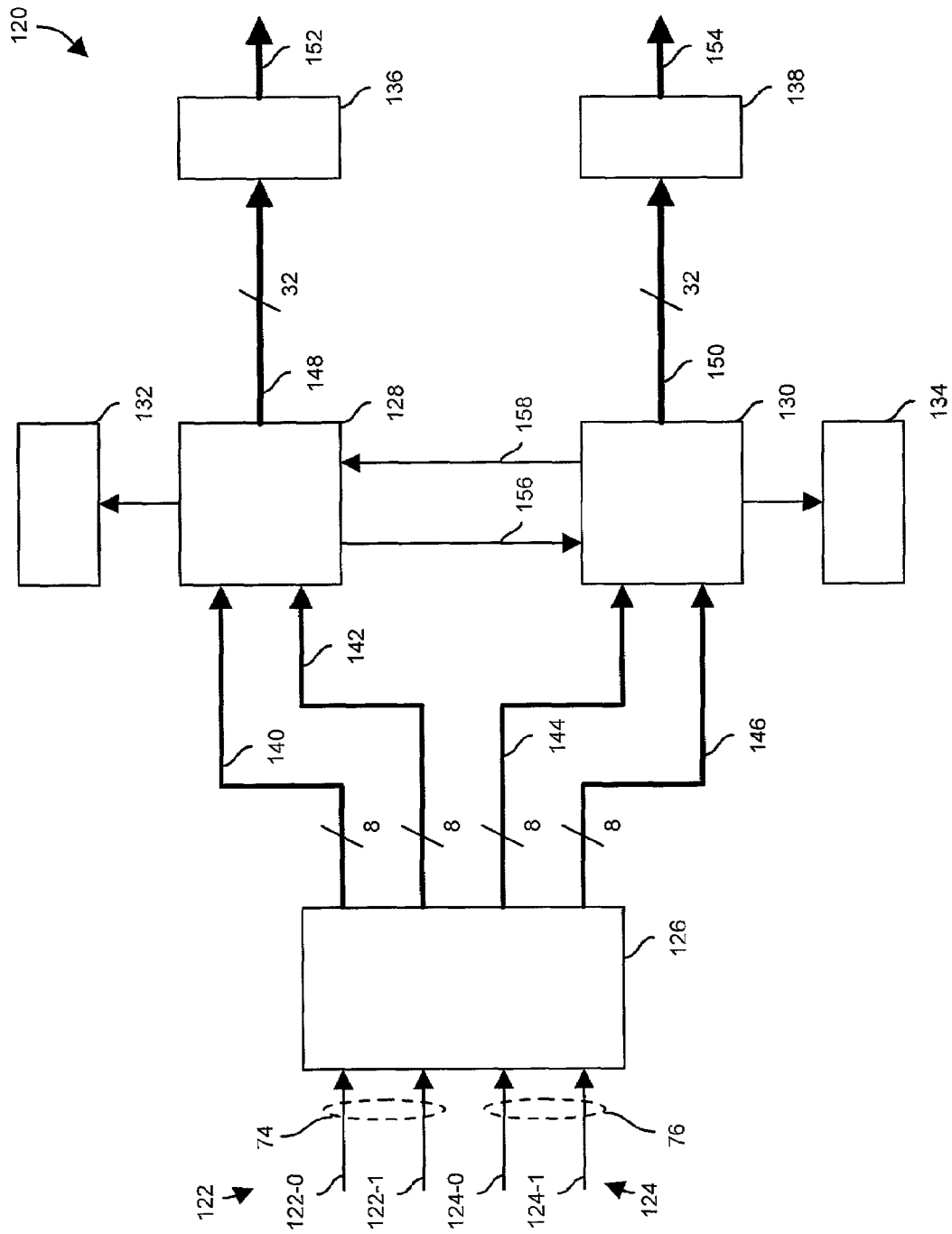
FIG. 4 is a block diagram of a circuit of a pre-processor of the system analyzer of FIG. 1.

FIG. 4 is a block diagram of circuitry 120 within the pre-processor 50 of the pre-processing device 40. In one arrangement, the pre-processing device 40 includes multiple pre-processors 50, one pre-processor 50 corresponding to each channel of the data storage system 22 which is monitored by the system analyzer 20. In one arrangement, and as will be discussed later, the system analyzer 20 is scalable and additional pre-processor devices 40 can be added as needed in order to accommodate resource issues, e.g., additional circuit board space, additional capacity, etc.

As shown in FIG. 4, the pre-processor 50 includes a first set of inputs 122-0, 122-1 (collectively, inputs 122), a second set of inputs 124-0, 124-1 (collectively, inputs 124), a SERDES device 126, a first controller 128, a second controller 130, a first display 132, a second display 134, a first output 136 and a second output 138. A set of connections 140, 142, 144, 146 (i.e., 8-bit wide parallel data paths) connects the SERDES device 126 to the controllers 128, 130. A set of connections 148 connects the controller 128 to the output 134. A set of connections 150 connects the controller 130 to the output 138. The pre-processor 50 operates to pre-process copies of point-to-point signals exchanged between a control module 26, 30 and a memory module 28 through a channel of the interconnection mechanism 24.

In one arrangement, the data storage system 22 includes many channels (e.g., see the channel 70 of FIG. 2), each channel connecting a control module 26, 30 to a memory module 28. In such an arrangement, the pre-processing device 40 includes many pre-processors 50, each pre-processor 50 handling copies of point-to-point signals for a particular data storage system channel.

During pre-processor operation, the circuitry 120 simultaneously pre-processes a set of point-to-point signals from the control module 26 and a set of point-to-point signals from the memory module 28 (also see FIG. 2). In particular, the inputs 122 connect to the conductors 78 of the interconnection mechanism 24 (FIG. 2) to receive the set of point-to-point signals 76 (i.e., a copy of the set of point-to-point signals 74 which are sent from the control module 26 to the memory module 28, see FIG. 2). Similarly, the inputs 124 connect to the conductors 86 of the interconnection mechanism 24 to receive the set of point-to-point signals 84 (i.e., a copy of the set of point-to-point signals 82 which are sent from the memory module 28 to the control module 26, again see FIG. 2).

The SERDES device 126 de-serializes information the sets of point-to-point signals 76, 84 and passes the de-serialized information to the controllers 128, 130. It should be understood that de-serialization of the information within the point-to-point signals enables the logic analyzer 42 to process non-serialized data (e.g., signals in parallel form) even though the point-to-point signals exchanged with the data storage system 22 may include serialized information traveling through point-to-point channels 70.

The information from one point-to-point signal of the set of point-to-point signals 76 (e.g., a high byte) then travels in a parallel manner (e.g., as a byte) through the connections 140 to the controller 128, and the information from another point-to-point signal of the set of point-to-point signals 76 (e.g., a low byte) travels in a parallel manner through the connections 142 to the controller 128. Similarly, the information from one point-to-point signal of the set of point-to-point signals 84 (e.g., a high byte) travels in a parallel manner through the connections 144 to the controller 130, and the information from another point-to-point signal of the set of point-to-point signals 84 (e.g., a low byte) travels in a parallel manner through the connections 146 to the controller 130. The controllers 128, 130 generate pre-processed signals from the information in the sets of point-to-point signals 76, 84 and pass the pre-processed signals to the outputs 136, 138. Conductors 152, 154 then convey the pre-processed signals from the outputs 136, 138 to the output port 46 (FIG. 1) of the pre-processing device 40 for transfer to the logic analyzer 42. In one arrangement, the pre-processed signals include all of the data from the original point-to-point signals 76, 84 as well as status information resulting from error checking the point-to-point signal 76, 84. Further details of this feature of the invention will be described later.

A bi-directional communications link formed by conductors 156 and 158 connects the controllers 128 and 130 together. As will be explained shortly, the controllers 128, 130 exchange signals through these conductors 156, 158 for protocol checking purposes.

As the controllers 128, 136 operate, the controller 128, 136 provide signals to the displays 132, 134 for rendering. For example, the controllers 128, 136 can count the number and/or types of transactions (e.g., data transfers) occurring through the point-to-point channel 70 by monitoring the sets of point-to-point signals 76, 84 which are copies of the sets of point-to-point signals 74, 82 passing through the point-to-point channel 70. The controllers 128, 136 can then display such counts on the displays 132, 134. In one arrangement, the displays 132, 134 are LEDs which indicate how much traffic passes through the point-to-point channel 70 during a particular period of time (e.g., an LED level meter, a light which changes in intensity, a row of LEDs which flicker side-to-side at a rate commensurate with the amount of traffic, etc.). Further details of the controllers 128, 130 will now be provided with reference to FIG. 5.

Figure 5:
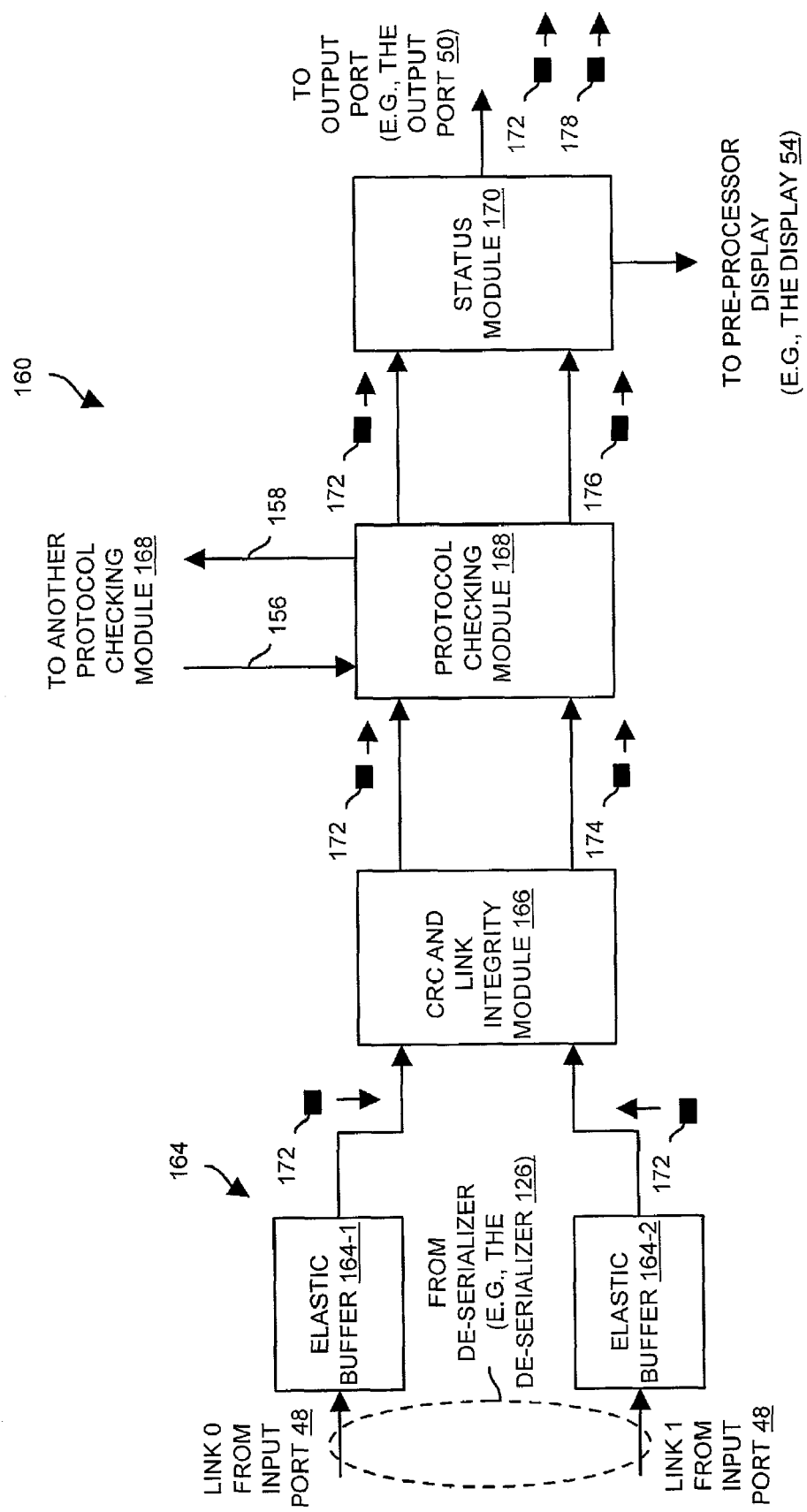
FIG. 5 is a block diagram of a controller of the circuit of FIG. 4.

FIG. 5 is a block diagram of a circuit configuration 160 which is suitable for use by each of the controllers 128, 130. The configuration 160 includes elastic buffers 164-1, 164-2 (collectively, elastic buffers 164), a cyclic redundancy check (CRC) and link integrity module 166, a protocol checking module 168 and a status module 170. The components 164, 166, 168 and 170, by way of example only, are arranged in a pipelined manner.

During operation, each elastic buffer 164 receives a de-serialized version of a point-to-point signal. For example, suppose that the circuit configuration 160 corresponds to the set of point-to-point signals 76 which is a copy of the set of point-to-point signals 74 sent from the control module 26 to the memory module 28 (also see FIG. 2). The elastic buffer 164-1 receives de-serialized information from one signal of the set of point-to-point signals 74 (e.g., high bytes of information), and the elastic buffer 164-2 receives de-serialized information from another signal of the set of point-to-point signals 74 (e.g., low bytes of information). The elastic buffers 164 compensate for slight differences in clocking speed of the originator of the set of point-to-point signals 76 (e.g., the control module 26) and clocking speed on the adaptor module 38. For example, the elastic buffers 164 are equipped to (i) add or drop idle characters (e.g., K28.5 characters) from the data stream and (ii) notify subsequent circuitry of such a change. After the elastic buffers 164 capture the de-serialized information, the elastic buffers 164 provide the de-serialized information, i.e., data 172, to the CRC and link integrity module 166.

Upon receipt of the de-serialized information, the CRC and link integrity module 166 processes the de-serialized information from a CRC and link integrity perspective. In particular, the CRC and link integrity module 166 determines whether there are any bit errors in the incoming data. If there are no bit errors in the data, the CRC and link integrity module 166 checks a CRC value within the data in view of other data components (e.g., an address/command frame, a data frame, a status frame, etc.). In one arrangement, the CRC checking operations are activated and deactivated by control logic within the CRC and link integrity module 166 which keeps track of transactions taking place on the channel. In particular, the control logic activates the CRC checking operation in response to receipt of an address/command frame, a data frame, or a status frame.

It should be understood that, in one arrangement, the CRC and link integrity module 166 is flexible and can be programmed to perform protocol checking operations for other protocols, e.g., protocols in which a CRC value is not present. For example, the CRC and link checking module 166 can be configured to perform parity checking, or applying other error checking algorithms. Additionally, the CRC and link checking module 166 can be configured to detect more or less bit fields (e.g., an extra byte or an extra command contained in the data), and bit fields arranged in different orders. Accordingly, in some arrangements, the CRC and link integrity module 166 operates generally to perform error checking and/or link integrity operations.

After the CRC and link integrity module 166 processes the data, the CRC and link integrity module 166 passes the data 172 and its processing results 174 (e.g., indications whether there are any bit errors, CRC checking results, etc.) to the protocol checking module 168. The protocol checking module 168 keeps track of various data-formatting attributes such as verifying that the frames are in the proper format and length, verifying that the frames are in the proper order and that no erroneous activities took place, etc. In one arrangement, the protocol checking module 168 of the controller 128 which handles the point-to-point signals from a particular control module 26 to a particular memory module 28 communicates with a corresponding protocol checking module 168 of the controller 130 handling the point-to-point signals from the particular memory module 28 to the particular control module 26 for additional protocol scrutiny (e.g., to verify that the memory module 28 sends back requested data during a write transfer). To this end, the protocol checking module 168 sends signals through the conductor 158 and receives signals through the conductor 156 with the corresponding protocol checking module 168 connected on the other end. In this way, the protocol checking modules 168 can tell each other what they are doing so that neither violates protocol. For example, if one protocol checking module 168 observes a read command, that protocol checking module 168 can notify the corresponding protocol checking module to expect a memory response in response to the read command. The protocol checking module 168 then passes the data 172 and processing results 176 (e.g., a combination of results from the CRC and link integrity module 166 and from the protocol checking module 168) to the status module 170.

The status module 176 generates an explanation/status code 178 for each character of the data 172. In one arrangement, the status module 176 provides an explanation/status code 176 for each character of the data 172, as well as each character of statistical information gathered by the circuitry of the previous pipelined stages. The status module 176 then outputs the data 172 and the status codes 178 for transfer to the logic analyzer 42 through the output port 46. Additionally, the status module 176 provides a signal to the display 48 of the pre-processor device 40 in order to render operating information to a user of the system analyzer 20 (e.g., how much traffic is passing through the monitored channel).

Since the data 172 and the status 178 are driven through the output port 46 and through the cable 54 to the logic analyzer 42 by the pre-processor 50 (also see FIG. 1), the logic analyzer 42 can be located relatively far from the pre-processor 50 (e.g., one to two feet or meters). Additionally, the cable 54 can easily disconnect from the logic analyzer 42 and connect, along with other cables 54 from other pre-processors 50, to a set of expansion chassis (to be explained shortly in connection with FIG. 7) which are disposed between the pre-processors 50 and the logic analyzer 42 thus providing convenient flexibility and scalability for the system analyzer 20 (e.g., the capability to process many point-to-point signals of the data storage system 22 simultaneously).

It should be understood that the configuration 160 for the controllers 128, 130 enable the pre-processor 50 to perform error checking operations without the use of the logic analyzer 42. Both the data 172 and the pre-processing results 178 can then be provided to the logic analyzer 42 for further processing and analysis. As a result, pre-processor 50 can perform error-checking operations prior processing by the logic analyzer thus offloading at least some of the error-checking burden from the logic analyzer and freeing the logic analyzer to perform other functions (e.g., process other monitored signals).

It should be further understood that the circuit configuration 160 of FIG. 5 was described above as being suitable for a controller 128 (FIG. 4) which handles point-to-point signals from a control module 26, by way of example only. It should be understood that the circuit configuration 160 is also suitable for the controller 130 which handles point-to-point signals from a memory module 28. In one arrangement, a pair of control modules 128, 130 operates together to pre-process point-to-point signals through a channel for each channel of the data storage system 22. In some arrangements, the data storage system 22 includes channels between memory modules 28 and control modules 26 operating as front-ends to the data storage system 22, as well as between memory modules 28 and control modules 30 operating as back-ends to the data storage system 22. In such arrangements, the system analyzer 20 includes many pairs of control modules 128, 130 for processing copies of all of the point-to-point signal pairs. Further details of the invention will now be provided with reference to FIG. 6.

Figure 6:
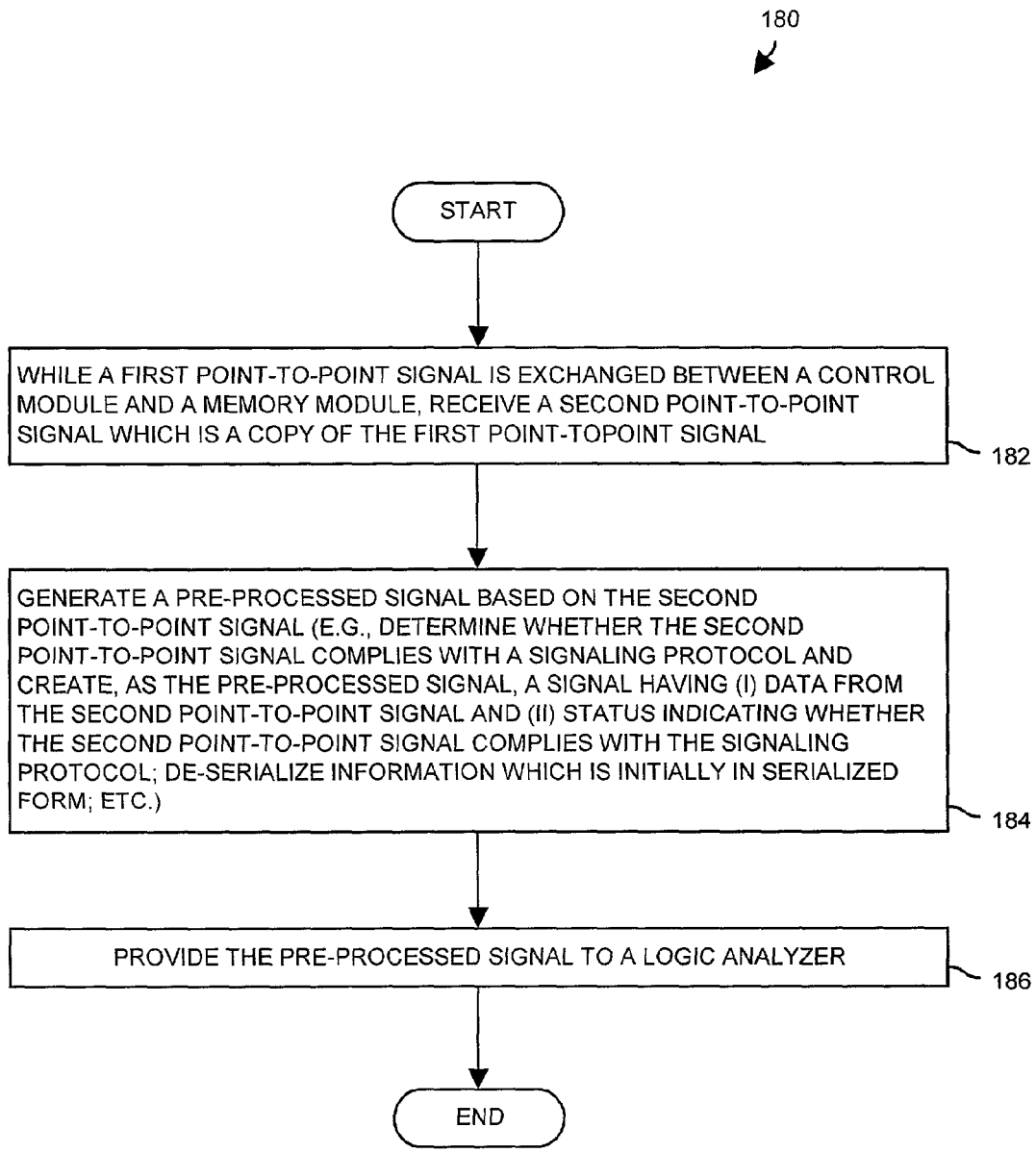
FIG. 6 is a flowchart of a procedure performed by the pre-processor of the system analyzer of FIG. 1.

FIG. 6 is a flowchart of a procedure 180 which is performed by a pre-processor 50 of the pre-processing device 40. The procedure 180 describes how the pre-processor 50 operates while interconnected between the data storage system 22 and the logic analyzer 42 of the system analyzer 20.

In step 182, the pre-processor 50 receives, while a first point-to-point signal is exchanged between a control module 26, 30 and a memory module 28, a second point-to-point signal which is a copy of the first point-to-point signal. For example, as shown in FIG. 2, the pre-processor 50 receives the point-to-point signal 76 (which is a copy of the point-to-point signal 74 exchanged between the control module 26 and the memory module 28) through the adaptor module 38.

In step 184, the pre-processor 50 generates a pre-processed signal based on the second point-to-point signal. In particular, the pre-processor 50 de-serializes data within the second point-to-point signal. The pre-processor 50 then determines whether the second point-to-point signal complies with a signaling protocol and creates, as the pre-processed signal, a signal having (i) data from the second point-to-point signal and (ii) status indicating whether the second point-to-point signal complies with the signaling protocol. A protocol, which is suitable for use for the point-to-point signals used by the data storage system 22 and monitored and analyzed by the system analyzer 20, is described in U.S. patent application Ser. No. 09/741,494, filed Dec. 19, 2000 and entitled "METHODS AND APPARATUS FOR TRANSFERRING A DATA ELEMENT WITHIN A DATA STORAGE SYSTEM," the teachings of which have been incorporated by reference in their entirety.

In step 186, the pre-processor 50 provides the pre-processed signal to the logic analyzer 42 for analysis. The logic analyzer 42 can then receive the pre-processed signal and display information regarding the operation of the data storage system 22 (e.g., for testing and debugging by a user). In one arrangement, the logic analyzer 42 is highly scalable and configurable, offering several types of capture/acquisition cards with different acquisition buffer speeds and memory depths for flexibility. In one arrangement, the logic analyzer 42 runs software that facilitates configuration such as allowing a user to customize input signal types and capture options (e.g., asynchronous mode, state mode, setup/hold time, etc.). For example, the user can configure the logic analyzer 42 to decode the 8-bit status into text. Furthermore, the user preferably can configure complex triggers to selectively capture data or trigger on complex events.

A logic analyzer similar to that described above is provided by Tektronix, Inc. of Beaverton, Oreg. Additionally, ancillary components and related equipment (e.g., expansion boxes, cables, etc.) which are suitable for use with the logic analyzer 42 described above is also provided by Tektronix, Inc. of Beaverton, Oreg. Another logic analyzer similar to that described above is provided by Agilent Technologies of Palo Alto, Calif.

As described above, the invention is directed to techniques for monitoring operation of a data storage system 22 having a control module 26, 30 and a memory module 28. The techniques use, while a first point-to-point signal 74, 82 is exchanged between the control module 26, 30 and the memory module 28, a second point-to-point signal 76, 84 which is a copy of the first point-to-point signal 74, 82. Use of the second point-to-point signal 76, 84 alleviates the need to tap into or snoop the first point-to-point signal 74, 82. Accordingly, drawbacks characterizing a conventional approach of removing a module from a set of multi-drop buses and replacing that module with a customized module that monitors the set of multi-drop buses (e.g., being unable to test the data storage system under a maximum traffic load) are avoided. Moreover, the techniques of the invention are well-suited for use in data storage systems having communications media that are not multi-drop buses such as in data storage systems having point-to-point architectures. The features of the invention, as described above, may be employed in computerized systems, components and procedures as well as other electronic testing and debugging devices such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

Figure 7:
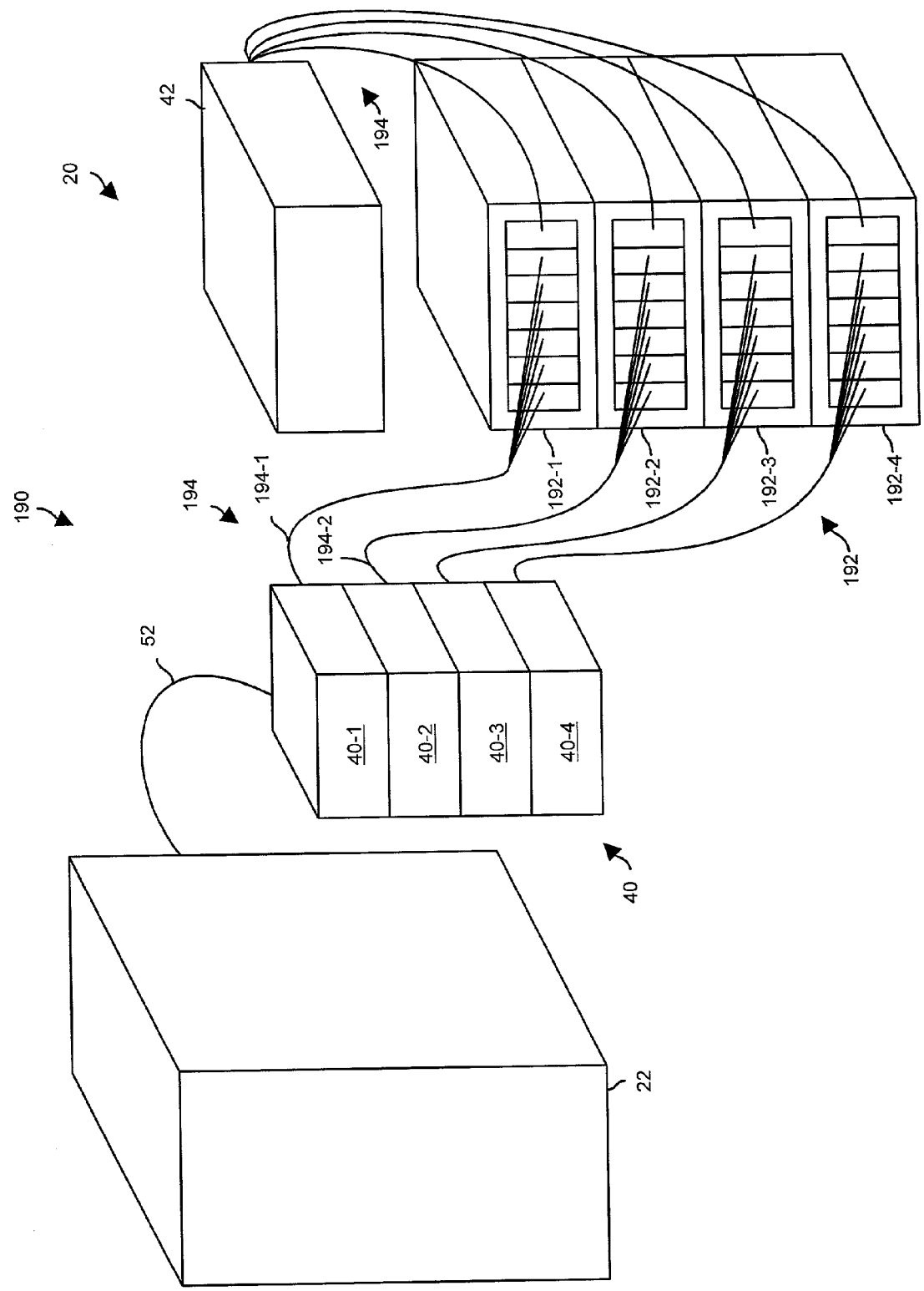
FIG. 7 is a perspective view of the data storage system of FIG. 1 and a system analyzer having a configuration that is an alternative to that of the system analyzer of FIG. 1.

For example, FIG. 7 shows a configuration 190 includes the data storage system 22 of FIG. 1 and a system analyzer 192. The system analyzer 20 of FIG. 7 is similar to that of the system analyzer 20 except that it includes multiple pre-processing devices 40 (i.e., pre-processing devices 40-1, 40-2, . . .) and a set of expansion devices 192. A set of cables 194 (i.e., cables 194-1, 194-2, . . .) respectively connect the pre-processing devices 40 to corresponding expansion devices 192. Similarly, a set of cables 196 respectively connect the expansion devices 192 to the logic analyzer 40.

The expansion devices 192 can include a local power supply, a backplane and multiple expansion cards which enable any device plugged into to it to operate as if that device were plugged directly into the logic analyzer 42. An expansion chassis and related components which are suitable for use as an expansion device 192 are provided by Tektronix, Inc. of Beaverton, Oreg.

In the configuration 190, multiple point-to-point signals are pre-processed by each pre-processing device 40. As the number of handled signals increases, expansion devices 42 are needed to physically coordinate and carry all of the signals into the logic analyzer which can analyze the signals in a multiplexed manner.

It should be understood that the configuration 190 is well-suited for scaling. In particular, as the number of point-to-point signals to be monitored increases (e.g., due to the scalable size of the data storage system 22, due to a desire to monitor more channels within the data storage system 22, etc.), additional pre-processing devices 40 and expansion devices 192 can be added to handle the increased number of signals.

Additionally, it should be understood that the system analyzer 20 was described above as being suitable for monitoring and analyzing a data storage system 22 by way of example only. The system analyzer 20 is also well suited for monitoring and analyzing (e.g., testing and debugging) other types of devices and systems and well such as general purpose computer systems, networks, specialized circuitry, etc.

Furthermore, it should be understood that that the adaptor module 38 was described as replacing a standard client communication adaptor by way of example only. In other arrangements, the adaptor module 38 connects to a dedicated location of the interconnection mechanism 24, or a portion of a module that connects to the interconnection mechanism 24 (e.g., through connectors and etch that lead to the interconnection mechanism 24.

Additionally, it should be understood that the arrangements of the invention were described above as levering off of an off-the-shelf component which provides a first signal and a copy of the first signal intended for fault tolerance (i.e., the copy is a backup signal which is intended to be provided to the same target as the first signal in case the first signal is corrupted or lost), by way of example only. In other arrangements, such an off-the-shelf component is not used. Rather, in these arrangements, additional circuitry is provided to make a copy of the first signal. For example, in one arrangement, a resistor and an amplifier circuit tap off of a trace carrying the first signal in order to generate a copy of the first signal. Such additional circuitry can reside on the modules 26, 28, 30 such that both the first signals and the copies of the first signals (i.e., the second signals) travel through the interconnection mechanism 24 to different destinations (i.e., the first signals travel to another control/memory module 26, 28, 30, and the second signals travel to the adaptor module 38). Accordingly, the circuitry for providing the first and second signals necessarily reside in a single package or IC, but can be formed by a combination of circuit board components. Such modifications and enhancements are intended to be part of the invention.

What is claimed is:

1. A system analyzer for a data storage system having a control module and a memory module, the system analyzer comprising:
   a logic analyzer;
   an input port that couples to the data storage system;
   an output port that couples to the logic analyzer;

a pre-processor which is interconnected between the input port and the output port, the pre-processor being configured to:
receive, while a first point-to-point signal is exchanged between the control module and the memory module, a second point-to-point signal which is a copy of the first point-to-point signal,
generate a pre-processed signal based on the second point-to-point signal, and
provide the pre-processed signal to the logic analyzer;
an adaptor module;
a cable having a first end which connects to the adaptor module, and a second end which connects to the input port, the adaptor module being configured to:
buffer the second point-to-point signal, and
pass the second point-to-point signal through the cable and the input port to the pre-processor;
another cable having a first end which connects to the output port and a second end which connects to the logic analyzer; the pre-processor, when providing the pre-processed signal to the logic analyzer, being configured to:
pass the preprocessed signal through the output port and the other cable to the logic analyzer.

2. The system analyzer of claim 1 wherein the pre-processor, when generating the pre-processor signal, is configured to:
determine whether the second point-to-point signal complies with a signaling protocol; and
create, as the pre-processed signal, a signal which includes (i) data from the second point-to-point signal and (ii) status indicating whether the second point-to-point signal complies with the signaling protocol.

3. The system analyzer of claim 1 wherein the second point-to-point signal includes information in an initially serialized form, and wherein the pre-processor, when generating the pre-processor signal, is configured to:
de-serialize the information of the second point-to-point signal; and
form, as the pre-processed signal, a signal which includes the de-serialized information of the second point-to-point signal.

4. The system analyzer of claim 1 wherein the pre-processor, when receiving the second point-to-point signal, is configured to:
obtain, while the first point-to-point signal travels through a backplane between the control module and the memory module, the second point-to-point signal from one of the control module and the memory module through the backplane.

5. The system analyzer of claim 1 wherein the adapter module is configured to (i) physically connect to a backplane which interconnects the control module and the memory module, and (ii) acquire the second point-to-point signal directly from the backplane.

6. An interface of a data storage system having a control module and a memory module, the interface comprising:
an input port that couples to the data storage system;
an output port that couples to a logic analyzer; and
a pre-processor which is interconnected between the input port and the output port, the pre-processor being configured to:
receive, while a first point-to-point signal is exchanged between the control module and the memory module, a second point-to-point signal which is a copy of the first point-to-point signal,
generate a pre-processed signal based on the second point-to-point signal,
provide the pre-processed signal to the logic analyzer;
an adaptor module;
a cable having a first end which connects to the adaptor module, and a second end which connects to the input port, the adaptor module being configured to:
buffer the second point-to-point signal, and
pass the second point-to-point signal through the cable and the input port to the pre-processor;
another cable having a first end which connects to the output port and a second end which connects to the logic analyzer; the pre-processor, when providing the pre-processed signal to the logic analyzer, being configured to:
pass the pre-processed signal through the output port and the other cable to the logic analyzer.

7. The interface of claim 6 wherein the pre-processor, when generating the pre-processor signal, is configured to:
determine whether the second point-to-point signal complies with a signaling protocol; and
create, as the pre-processed signal, a signal which includes (i) data from the second point-to-point signal and (ii) status indicating whether the second point-to-point signal complies with the signaling protocol.

8. The interface of claim 6 wherein the second point-to-point signal includes information in an initially serialized form, and wherein the pre-processor, when generating the pre-processor signal, is configured to:
de-serialize the information of the second point-to-point signal; and
form, as the pre-processed signal, a signal which includes the de-serialized information of the second point-to-point signal.

9. The interface of claim 6 wherein the pre-processor, when receiving the second point-to-point signal, is configured to:
obtain, while the first point-to-point signal travels through a backplane between the control module and the memory module, the second point-to-point signal from one of the control module and the memory module through the backplane.

10. The interface of claim 6 wherein the adapter module is configured to (i) physically connect to a backplane which interconnects the control module and the memory module, and (ii) acquire the second point-to-point signal directly from the backplane.

11. A method for monitoring operation of a data storage system having a control module and a memory module, the method comprising the steps of:
simultaneously generating a first point-to-point signal and a second point-to-point signal on separate outputs of an integrated circuit so that (i) the first point-to-point signal travels through a first point-to-point channel between the control module and the memory module, and (ii) the second point-to-point signal travels through a second point-to-point channel between an adaptor module and one of the control module and the memory module;
while the first point-to-point signal is exchanged between the control module and the memory module, receiving the second point-to-point signal which is a copy of the first point-to-point signal;
buffering the second point-to-point signal after the step of receiving the second point-to-point signal;
passing the second point-to-point signal through a cable to a pre-processor;

after the step of passing, generating a pre-processed signal based on the second point-to-point signal; and providing the pre-processed signal to a logic analyzer, the step of providing the pre-processed signal to the logic analyzer including the step of passing the pre-processed signal through another cable to the logic analyzer.

12. The method of claim 11 wherein the step of generating the pre-processor signal includes the steps of:

determining whether the second point-to-point signal complies with a signaling protocol; and creating, as the pre-processed signal, a signal which includes (i) data from the second point-to-point signal and (ii) status indicating whether the second point-to-point signal complies with the signaling protocol.

13. The method of claim 11 wherein the second point-to-point signal includes information in an initially serialized form, and wherein the step of generating the pre-processor signal includes the steps of:

de-serializing the information of the second point-to-point signal; and forming, as the pre-processed signal, a signal which includes the de-serialized information of the second point-to-point signal.

14. The method of claim 11 wherein the step of receiving the second point-to-point signal includes the step of:

while the first point-to-point signal travels through a backplane between the control module and the memory module, obtaining the second point-to-point signal from one of the control module and the memory module through the backplane.

15. The method of claim 11, further comprising the step of:

physically connecting an adapter module to a backplane which interconnects the control module and the memory module, and wherein the step of receiving the second point-to-point signal includes the step of the adapter module acquiring the second point-to-point signal directly from the backplane.

16. A method for monitoring operation of a data storage system having a control module and a memory module, the method comprising the steps of:

sensing a first point-to-point signal from a first circuit board trace leading from a first circuit board component;

generating, from an amplifier circuit that is different than the first circuit board component, a second point-to-point signal on a second circuit board trace that is electrically isolated from the first circuit board trace so that (i) the first point-to-point signal travels through a first point-to-point channel between the control module and the memory module, and (ii) the second point-to-point signal travels through a second point-to-point channel between an adaptor module and one of the control module and the memory module;

while the first point-to-point signal is exchanged between the control module and the memory module, receiving the second point-to-point signal which is a copy of the first point-to-point signal;

buffering the second point-to-point signal after the step of receiving the second point-to-point signal;

passing the second point-to-point signal through a cable to a pre-processor;

after the step of passing, generating a pre-processed signal based on the second point-to-point signal; and providing the pre-processed signal to a logic analyzer, the step of providing the pre-processed signal to the logic analyzer including the step of passing the pre-processed signal through another cable to the logic analyzer.

17. The method of claim 16, further comprising the step of:

physically connecting an adapter module to a backplane which interconnects the control module and the memory module, and wherein the step of receiving the second point-to-point signal includes the step of the adapter module acquiring the second point-to-point signal directly from the backplane.

18. A system analyzer for a data storage system having multiple control modules and multiple memory modules, the system analyzer comprising:

a logic analyzer;

multiple pre-processors which are interconnected between the data storage system and the logic analyzer, each pre-processor being configured to:

receive a point-to-point signal which is a copy of another point-to-point signal, generate a pre-processed signal based on that received point-to-point signal, and provide that generated pre-processed signal to the logic analyzer; and multiple expansion chassis interconnected between the multiple pre-processors and the logic analyzer, each expansion chassis being configured to:

receive pre-processed signals from a corresponding one of the pre-processors, and direct the received pre-processed signals to the logic analyzer.

19. The system analyzer of claim 18 wherein each pre-processor is configured to provide pre-processed signals to a corresponding expansion chassis in a multiplexed manner.

20. The system analyzer of claim 18 wherein the data storage system further has a backplane that interconnects the multiple control modules and the multiple memory modules, and wherein the system analyzer further comprises:

an adapter module which is configured to (i) physically connect to the backplane, (ii) acquire point-to-point signals directly from the backplane, and (iii) convey the point-to-point signals to the multiple pre-processors.

* * * * *

UNITED STATES PATENT AND TRADEMARK OFFICE
CERTIFICATE OF CORRECTION

PATENT NO. : 6,973,593 B1
DATED : December 6, 2005
INVENTOR(S) : Mark Zani, Ofer Porat and Alexander Rabinovich It is certified that error appears in the above-identified patent and that said Letters Patent is hereby corrected as shown below:

Column 15,
Line 57, "an interface of" should read -- an interface for --.

Signed and Sealed this

Twenty-eighth Day of February, 2006

JON W. DUDAS
*Director of the United States Patent and Trademark Office*